June 28, 1966  J. A. TURNER  3,258,003
PORTABLE SMOKE GENERATOR
Filed Nov. 18, 1964  2 Sheets-Sheet 1

INVENTOR.
JAMES A. TURNER
BY
Kenyon & Kenyon
ATTORNEYS

June 28, 1966

J. A. TURNER 3,258,003

PORTABLE SMOKE GENERATOR

Filed Nov. 18, 1964

INVENTOR.
JAMES A. TURNER
BY
Kenyon & Kenyon
ATTORNEYS

United States Patent Office 3,258,003
Patented June 28, 1966

3,258,003
PORTABLE SMOKE GENERATOR
James A. Turner, Rosedale, Ind., assignor to Hygrade Food Products Corporation, Detroit, Mich., a corporation of New York
Filed Nov. 18, 1964, Ser. No. 412,062
7 Claims. (Cl. 126—59.5)

The present invention relates to smoke generators for providing smoke to be used for treating food products such as ham, bacon, sausage and other like products.

The processing of certain food products, such as bacon, for example, includes the step of smoking to enhance flavor and appearance. The smoking operation is generally conducted in a smokehouse and requires the use of a generator to provide smoke. Such smoke generators are operated in a manner to provide incomplete combustion of the fuel, and are preferably designed to provide a fuel bed which smolders, thereby giving off a continuous stream of dense smoke.

Ideally, the smoke produced by a smoke generator should be at the lowest possible temperature, to provide improved adhesion of the smoke to the food product and also better penetration of the smoke into the interior of the food product. In this manner, smoking time can be minimized since the smoking efficiency is relatively high. Clearly, minimization of smoking time is advantageous, since it decreases the overall processing time for the food product and also conserves fuel.

In meat packing houses, there are generally several smokehouses which are utilized for treating and curing a variety of food products. Thus, for example, one smokehouse may be employed for treating frankfurters and sausages, a second smokehouse for bacon, a third smokehouse for bologna and salami, etc. In the conventional installation, each of these smokehouses is provided with a separate smoke generator. In view of the fact that the smoking operation is but one step in the curing process, it is evident that the smoke generator is not utilized throughout the processing cycle. Thus, smoke generators are generally idle for a considerable period of time during each processing cycle.

Accordingly, it is an object of the present invention to provide a smoke generator which produces a relatively cool smoke which is adhesive to food products and exhibits desirable penetration characteristics.

Another object of the present invention is to provide a smoke generator which is compact and portable.

A further object of the present invention is to provide a smoke generator which produces a relatively high yield of smoked product per unit of fuel consumed.

Briefly described, one embodiment of the present invention comprises a housing having a generally cylindrical wall and a top and a bottom, an air distributor located in the housing adjacent the top thereof, an air blower connected to said air distributor, a fuel charging hopper mounted on the top of said housing and communicating with the interior thereof, a cover associated with said hopper for making a seal, a fuel-supporting grate in said housing located adjacent the bottom thereof, a blow-back header positioned within said housing below said grate, said header including a plurality of nozzles directed upwardly at said grate, means for introducing air into said header, smoke outlet conduit communicating with the interior of said housing at a point below said header, a cooling water jacket disposed on the lower half of said housing and having water inlet and outlet connections, means located in the bottom of said housing for maintaining a pool of water below the intersection of said smoke conduit and said housing wall, and rotatable means supporting said housing to provide portability.

The present invention will be more readily understood when described in conjunction with the drawings in which.

Figure 2:
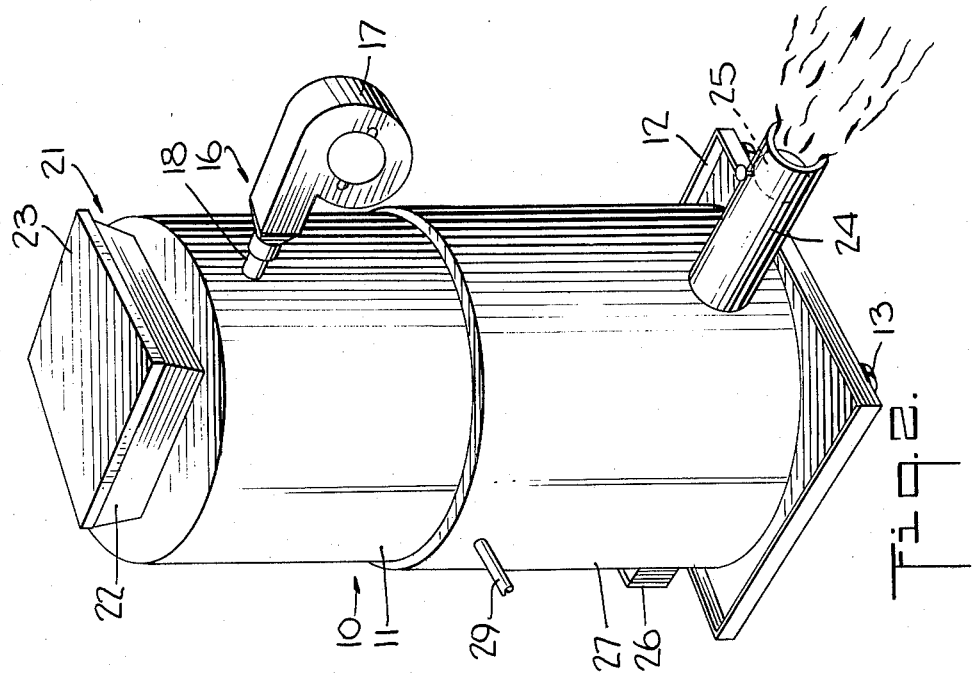
FIG. 2 is a perspective view of the embodiment of FIG. 1 when viewed from another angle.
Figure 1:
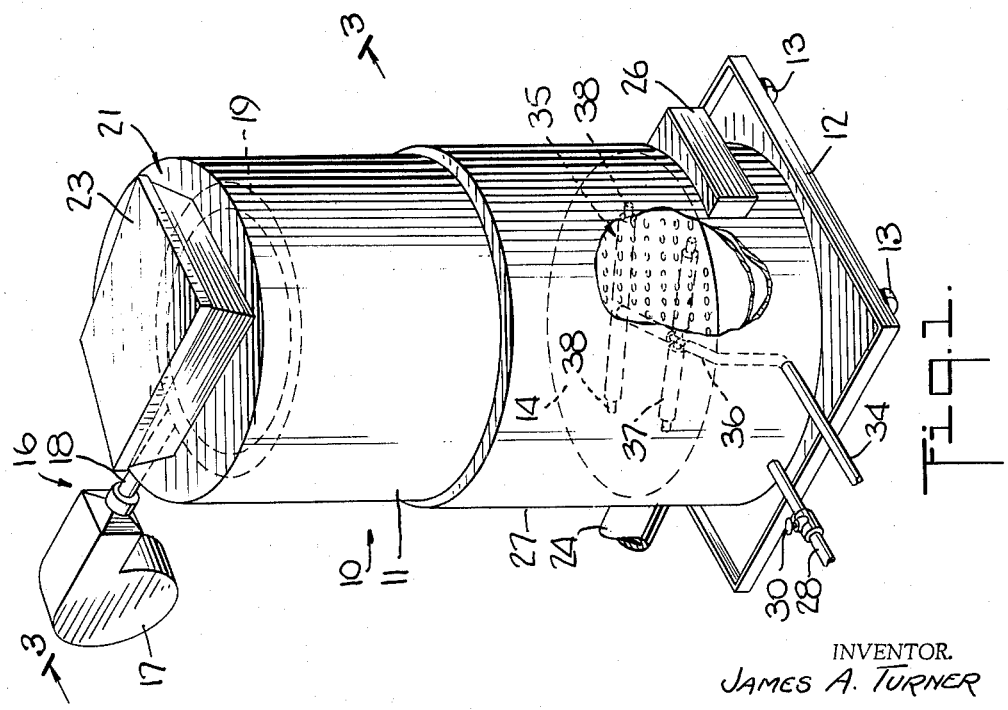
FIG. 1 is a perspective view, partly in section, of one embodiment of the present invention.

With respect to FIG. 1, there is depicted one embodiment of the present invention. Shown in FIG. 1 is smoke generator 10 including housing 11, which is preferably cylindrical in shape. Housing 11 is mounted on platform 12 which is supported by casters 13. In the embodiment depicted, platform 12 serves as a base for housing 11. Preferably, housing 11 is welded to platform 12 to assure an airtight seal.

A grate 14 is located in the lower portion of housing 11 and serves to support the fuel bed 15.

Figure 3:
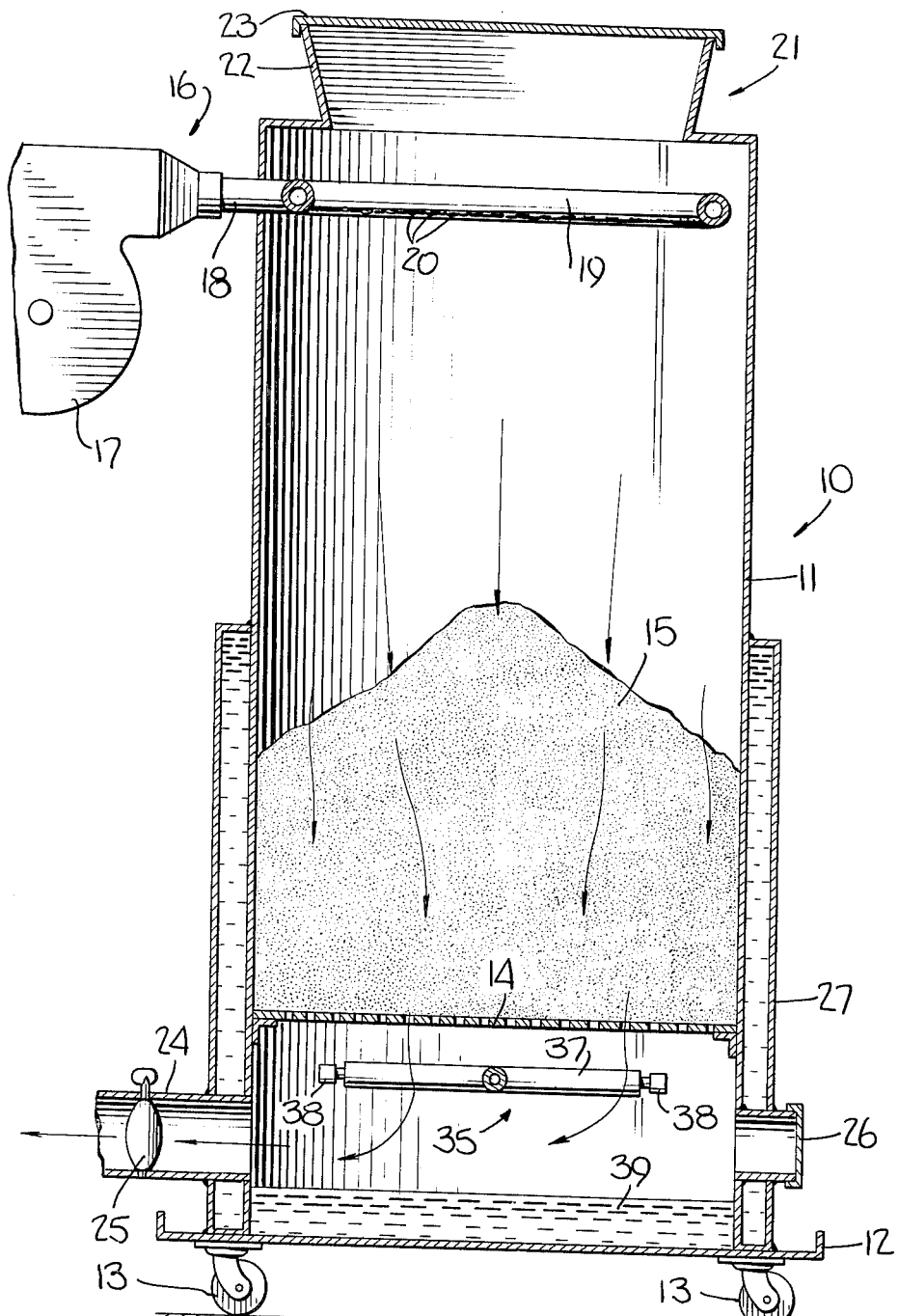
FIG. 3 is a side elevational view in section taken along the lines shown in FIG. 1.

Combustion air for normal operation is provided by air system 16. This system comprises an air blower 17 which is connected to a pipe 18. Pipe 18 is connected to a ring-shaped header 19 which is located in the upper section of housing 11. Header 19 includes a plurality of small openings 20 oriented as shown in FIG. 3 for introducing air from the air system into housing 11.

Assembly 21 is provided for charging fuel into housing 11. Assembly 21 consists of a hopper 22 which is mounted on the top of housing 11. An opening is provided in the top of housing 11 through which the fuel is charged. A hatch cover 23, which rests on the top of the hopper 22, is employed as a seal to prevent the escape of smoke through hopper 22.

Conduit 24 is provided to transport the smoke from housing 11 to the smokehouse. Hand-operated damper 25 is provided in conduit 24 to control the flow of smoke into the smokehouse, not shown.

Ash cleanout 26 is provided to removed burned fuel or entrained solids which collect in the lower portion of housing 11. The details of cleanout 26 are not shown, any suitable means for permitting access and airtight sealing being suitable.

The lower portion of housing 11 is provided with a water jacket 27. Jacket 27 is provided with a water inlet pipe 28 and water outlet pipe 29. The flow of cooling water is regulated by manually operated valve 30 which is located in water inlet pipe 28.

Air at a pressure of 70 p.s.i. is used for cleaning grate 14 during the operation of generator 10. To this end, pipe 34 is connected to an air source (not shown). A manually operated valve, not shown, is provided for regulating the flow of air.

Pipe 34 is connected to a header system 35 located below grate 14. Header system 35 comprises main pipe 36 to which are attached a pair of branch pipes 37. Nozzles 38 are connected to the respective ends of branch pipes 37 and are directed upwardly toward grate 14.

Provision is made for a body of water 39 to be maintained in the bottom of housing 11 during operation of generator 10. This water should have a minimum depth of about one inch. Water 39 serves as a spark arrester and also collects solid particles, such as fly ash, which may be entrained by the smoke.

Smoke generator 10 is operated in the following manner. The generator 10 is transported to the particular smokehouse which is to be supplied with smoke. Generator 10 is coupled to the smokehouse by attaching conduit 24 to the appropriate smoke inlet port of the smokehouse.

A mass of dampened, finely divided fuel, such as hardwood sawdust for example, is charged through fuel hopper 22 into generator 10. As is well known, the fuel is necessarily damp in order to afford a proper control of the combustion and thereby provide dense smoke. The amount of fuel charged is preferably sufficient to fill housing 11 from grate 14 up to a level above the water jacket 27. However, the amount of fuel can be adjusted to suit the particular needs of the situation.

A small amount of dry combustible material such as dry sawdust, excelsior, charcoal and the like is then added to form a thin layer on top of the dampened fuel charge. The dry fuel layer is then ignited.

After the bed of dampened sawdust is sufficiently ignited, the blower 16 is placed into service. Blower 16 provides air at a pressure of the order of 1.5 inches of water column. At this point in the operation, cooling water is introduced into water jacket 27 by opening valve 30 in inlet pipe 28.

The fuel is ignited at the top and burns downward through bed 15. Therefore, the smoke which results from the combustion travels down through the unburned fuel, passes through grate 14 and exits from housing 11 through conduit 24. Damper 25 is adjusted to provide the desired flow of smoke. Combustion may proceed at a rapid rate in some areas of the bed 15 thereby causing uneven burning and depletion down to or near grate 14. In such instance, fly ash or sparks may be entrained in the smoke. As the smoke changes direction in order to exit from housing 11 through conduit 24, the entrained particles will impinge on the water 39 and will be collected. By providing water in the bottom of housing 11, a degree of safety is assured in that sparks or other burning particles will not be transported into the smokehouse.

As indicated above, it is desirable that the temperature of the smoke be as low as possible in order to improve its adhesion and penetration characteristics. A relatively low smoke temperature is produced by the generator of the present invention. Aiding in this desirable result is the fact that the combustion air is passed downward through the entire fuel bed 15. Accordingly, a certain amount of the heat of the smoke is dissipated in the fuel bed 15. The heat in the fuel bed 15, in turn, is removed by the cooling water flowing in water jacket 27.

In addition to the above heat removal, water jacket 27 also serves to prevent overheating of the lower portion of housing 11. This also tends to limit the temperature of the smoke which is being produced.

One type of prior art smoke generator involves a passage of air upward through the unburned fuel to reach the burning area. Accordingly, the smoke is removed from this type of generator as soon as it is formed without contact with the unburned bed of fuel. Thus, the smoke is removed from such a generator at its highest temperature. Because of the requirements of low temperature smoke, the smoke from such a generator is often cooled by indirect heat exchange means, and during such cooling, various constituents of the smoke are unavoidably condensed into liquid or solid form. The removal of these constituents from the smoke decreases the "smoking efficiency" of the smoke, and accordingly an increased smoking time is required in order to achieve the desired results in the food product. Such after-cooling of the smoke is eliminated by the design of the smoke generator of the present invention.

A further advantage of the generator of this invention is that there is little or no smoke within the housing 11 above the fuel bed 15. This eliminates the undesirable leakage of smoke through the fuel charging assembly 21, for example, which might occur if cover 23 does not close properly. If leakage from within housing 11 does occur through the fuel charging assembly 21, such leakage will be substantially air rather than smoke.

During operation of generator 10, it is possible that the openings in grate 14 will become clogged and thereby interfere with the desired flow of smoke therethrough. If this occurs, air is introduced at a relatively high pressure into pipe 36. This air exits from nozzles 38 which are directed upwardly at grate 14. The pressure of the air emanating from nozzles 38 is sufficient to relieve any congestion of grate 14. It has been found that corrective action of this type is obtained by utilizing air from nozzles 38 for a period of about 15 seconds to one minute.

After shutdown of smoke generator 10, the ashes may be removed through ash cleanout 26.

As an optional feature, in order to insure proper ignition of the fuel charge, an auxiliary air system may be attached near the top of the smoke generator 10. The air in the auxiliary system, generally at a pressure between 50 and 70 p.s.i., facilitates the starting operation since it is desirable to obtain uniform combustion at this point. After the bed of dampened sawdust is sufficiently ignited, the auxiliary air system is shut off and blower 16 is placed into service.

The embodiment shown in the drawings and described above is intended to be illustrative of the present invention. It is to be understood that variations may be made by one skilled in the art and without departing from the spirit and scope of this invention.

What is claimed is:

1. A portable smoke generator for burning fuel to provide smoke for use in a food smokehouse comprising a portable housing having a top, side walls and a base, air distributing means positioned within said housing adjacent the top thereof, air supply means connected to said air distributor means, fuel support means within said housing located adjacent the base thereof, said last named means being adapted to permit passage of smoke therethrough, fuel charging entry means in the top of said housing communicating with the interior of said housing, said fuel charging entry means being adapted to provide air-tight closure, means associated with the housing for removing heat from the lower portion of said housing, smoke outlet means communicating with the interior of said housing and being located below said fuel support means, and means connected to said housing to provide portability.

2. A portable smoke generator for burning fuel to provide smoke for use in a food smokehouse comprising a housing having a top, side walls and a base, air distributing means positioned within said housing adjacent the top thereof, air supply means connected to said air distributor means, fuel support means within said housing located adjacent the base thereof, said last named means being adapted to permit passage of smoke therethrough, blow-back means located within said housing and below said fuel support means providing a plurality of relatively high velocity air streams which impinge on said fuel support means, fuel charging entry means communicating with the interior of the upper portion of said housing, said fuel charging entry means being adapted to provide air-tight closure, means associated with the housing for removing heat from the lower portion of said housing, smoke outlet means communicating with the interior of said housing and being located below said fuel support means, and means connected to said housing imparting portability to said smoke generator.

3. A portable smoke generator suitable for providing smoke for treating food products comprising a housing having a generally cylindrical wall and a top and a bottom, an air distributor located in the housing adjacent the top thereof, an air blower connected to said air distributor, a fuel charging hopper attached to the top of said housing and communicating with the interior thereof, a cover associated with said hopper for making a seal, a fuel supporting grate in said housing located adjacent the bottom thereof, a blow-back header positioned within said housing below said grate, said header including a plurality of nozzles directed upwardly at said grate, means for introducing air into said header, smoke outlet conduit communicating with the interior of said housing at a point below said header, a cooling water jacket disposed on the lower half of said housing and having water inlet and outlet connections, means at the bottom of said housing for maintaining a body of water below the intersection of said smoke conduit and said housing wall, and a plurality of casters connected to said housing to provide portability.

4. A portable smoke generator for burning fuel to provide smoke for use in a food smokehouse comprising a housing having a top, side walls and a base, air distributing means positioned within said housing adjacent the top thereof, air supply means connected to said air distributor means, fuel support means within said housing located adjacent the base thereof, said last named means being adapted to permit passage of smoke therethrough, blow-back means located within said housing and below said fuel support means providing a plurality of relatively high velocity air streams which impinge on said fuel support means, fuel charging entry means communicating with the interior of the upper portion of said housing, said fuel charging entry means being adapted to provide air-tight closure, means associated with the housing for removing heat from the lower portion of said housing, smoke outlet means communicating with the interior of said housing and being located below said fuel support means, means at the bottom of said housing for maintaining a body of water below said smoke outlet means, and means connected to said housing imparting portability to said smoke generator.

5. A portable smoke generator suitable for providing smoke for treating food products comprising a housing having a generally cylindrical wall and a top and a bottom, an air distributor located in the housing adjacent the top thereof, an air blower connected to said air distributor, a fuel charging hopper attached to the top of said housing and communicating with the interior thereof, a cover associated with said hopper for making a seal, a fuel supporting grate in said housing located adjacent the bottom thereof, a blow-back header positioned within said housing below said grate, said header including a plurality of nozzles directed upwardly at said grate, means for introducing air into said header, smoke outlet conduit communicating with the interior of said housing at a point below said header, a cooling water jacket disposed on the lower half of said housing and having water inlet and outlet connections, means at the bottom of said housing for maintaining a body of water below the intersection of said smoke conduit and said housing wall, ash cleanout communicating with the interior of said housing and located below said grate, and a plurality of casters connected to said housing to provide portability.

6. A portable smoke generator suitable for providing smoke for treating food products comprising a housing having a generally cylindrical wall and a top and a bottom, an air distributor located in the housing adjacent the top thereof, an air blower connected to said air distributor, a fuel charging hopper attached to the top of said housing and communicating with the interior thereof, a cover associated with said hopper for making a seal, a fuel supporting grate in said housing located adjacent the bottom thereof, a blow-back header positioned within said housing below said grate, said header including a plurality of nozzles directed upwardly at said grate, means for introducing air into said header, smoke outlet conduit communicating with the interior of said housing at a point below said header, a cooling water jacket disposed on the lower half of said housing and having water inlet and outlet connections, and means connected to said housing imparting portability to said generator.

7. A portable smoke generator for burning fuel to provide smoke for use in a food smokehouse comprising a housing having a top, side walls and a base, air distributing means positioned within said housing adjacent the top thereof, air supply means connected to said air distributor means, fuel support means within said housing located adjacent the base thereof, said last named means being adapted to permit passage of smoke therethrough, blow-back means located within said housing and below said fuel support means providing a plurality of relatively high velocity air streams which impinge on said fuel support means, fuel charging entry means communicating with the interior of the upper portion of said housing and located above said air distributor means, said fuel charging entry means being adapted to provide air-tight closure, means associated with the housing for removing heat from the lower portion of said housing, ash cleanout communicating with the interior of said housing and located below said fuel support means, smoke outlet means communicating with the interior of said housing and being located below said fuel support means, and means connected to said housing imparting portability to said smoke generator.

References Cited by the Examiner
UNITED STATES PATENTS

| | | | |
|---|---|---|---|
| 628,272 | 7/1899 | Lynott | 126—69 |
| 736,740 | 8/1903 | Kirch | 126—76 |
| 1,211,657 | 1/1917 | Atteberry | 126—103 |
| 1,444,647 | 2/1923 | Trout et al. | 126—59.5 |
| 2,543,033 | 2/1951 | Little | 126—103 X |

CHARLES J. MYHRE, *Primary Examiner.*